Jan. 12, 1926.
J. H. HAMMOND, JR
DIRIGIBLE DEVICE
Filed June 11, 1915
1,568,973
7 Sheets-Sheet 3
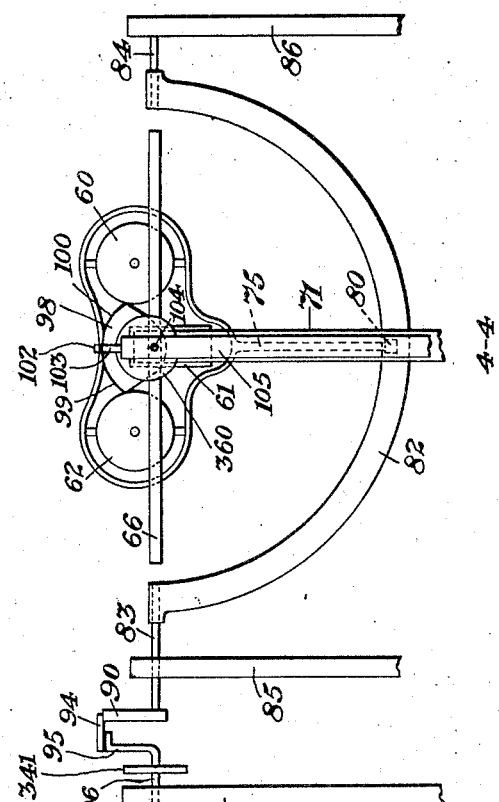
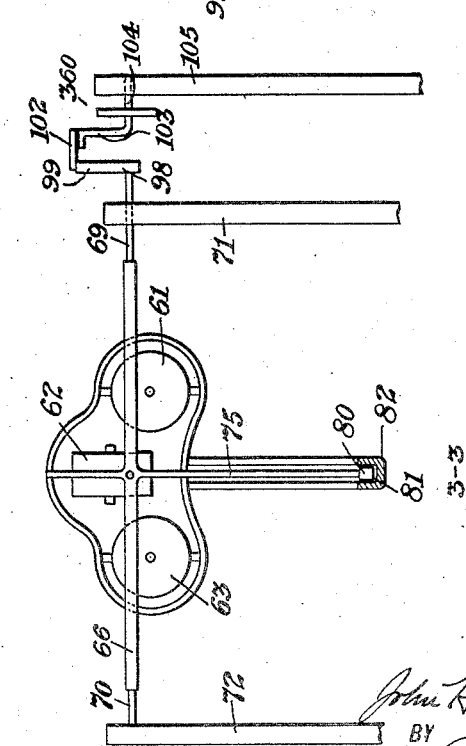
WITNESSES
Chas. J. Clagett
Albert V. Treno.
INVENTOR
John Hays Hammond Jr.
BY
A. J. Gardner
ATTORNEY Jan. 12, 1926.  1,568,973
J. H. HAMMOND, JR
DIRIGIBLE DEVICE
Filed June 11, 1915    7 Sheets-Sheet 4
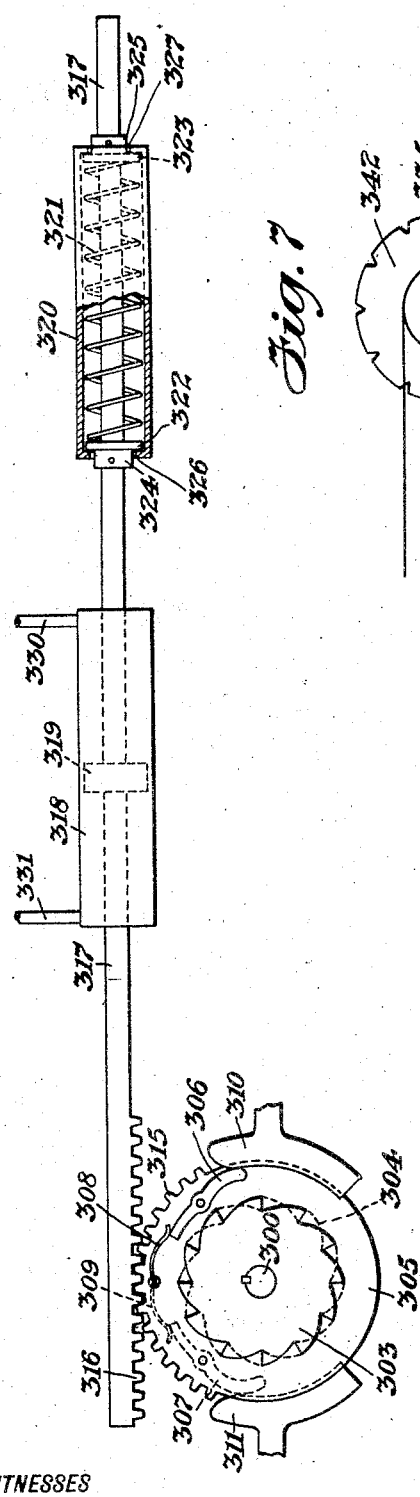
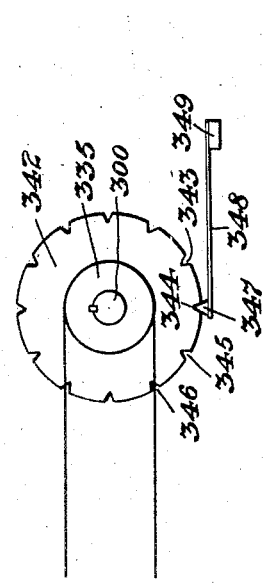
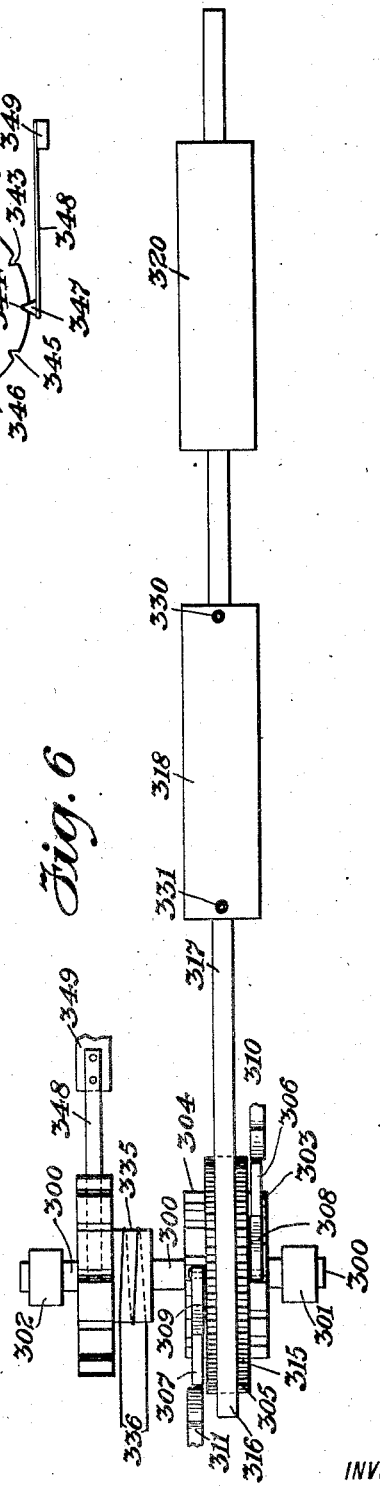
WITNESSES
Chas. J. Clagett
Albert W. Trimon.
INVENTOR
John Hays Hammond Jr.
BY
A. J. Gardner
ATTORNEY Jan. 12, 1926.
J. H. HAMMOND, JR
1,568,973
DIRIGIBLE DEVICE
Filed June 11, 1915
7 Sheets-Sheet 5
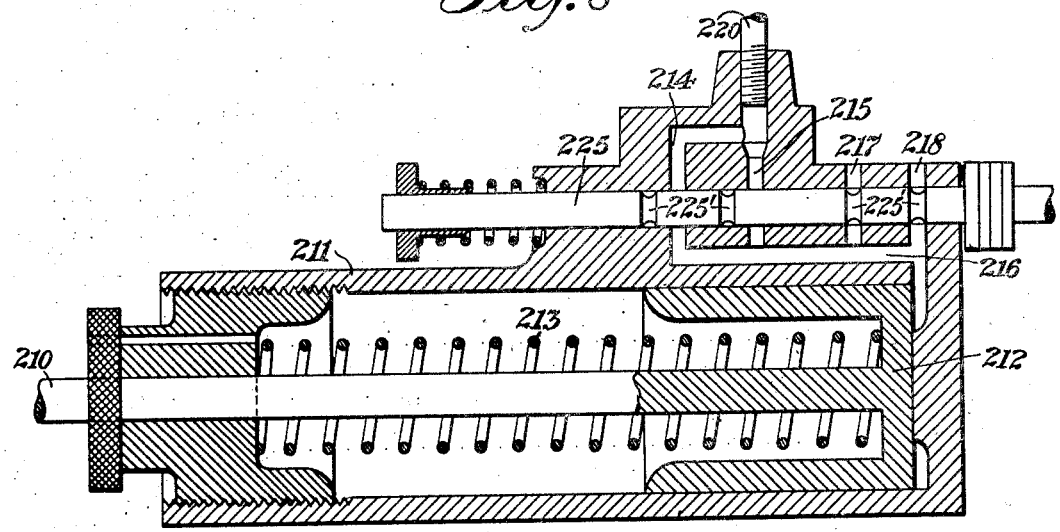
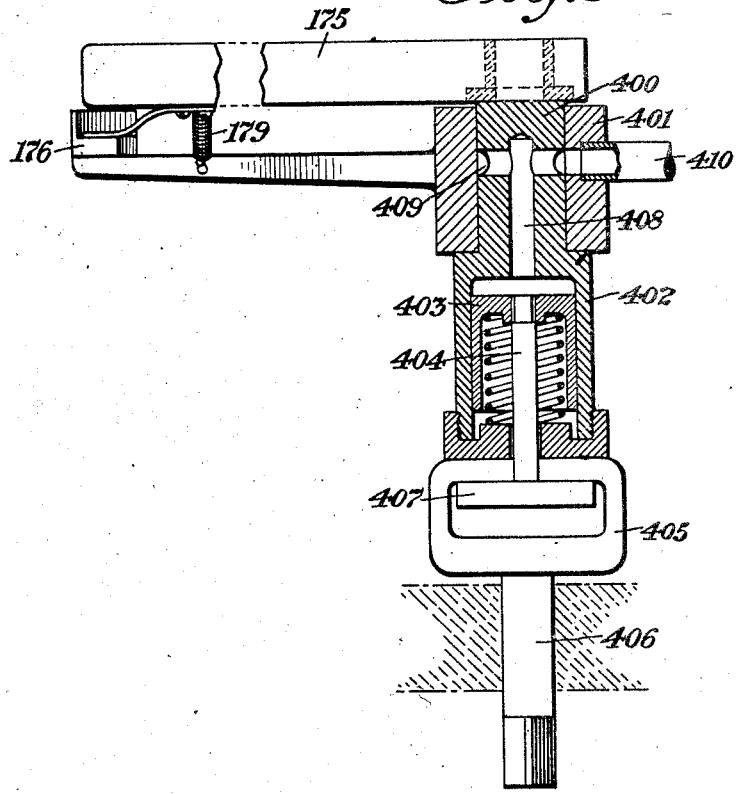
WITNESSES
Chas. J. Clagett
Albert W. Truman
INVENTOR
John Hays Hammond Jr.
BY A. S. Gardner
ATTORNEY Jan. 12, 1926.

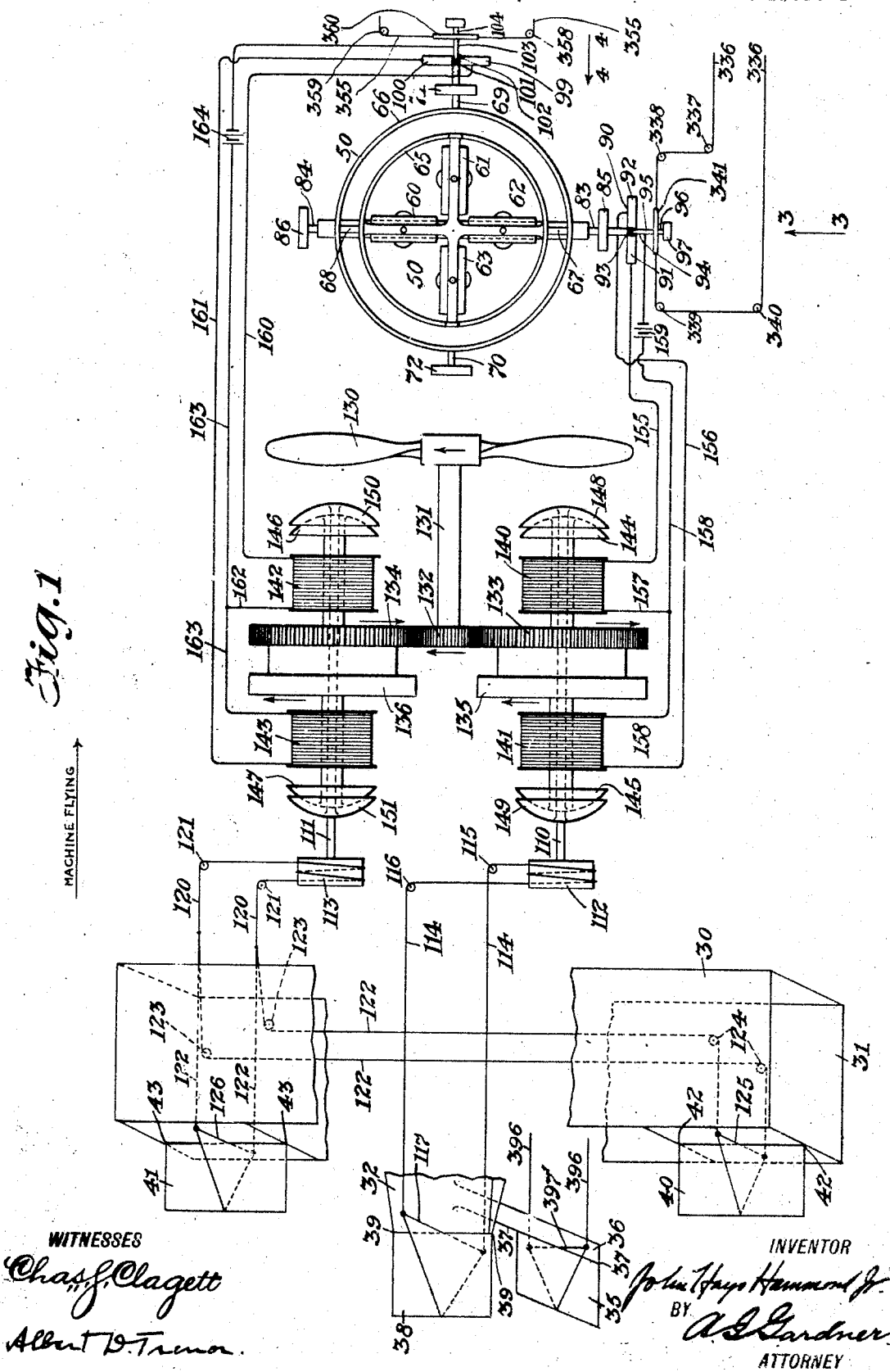

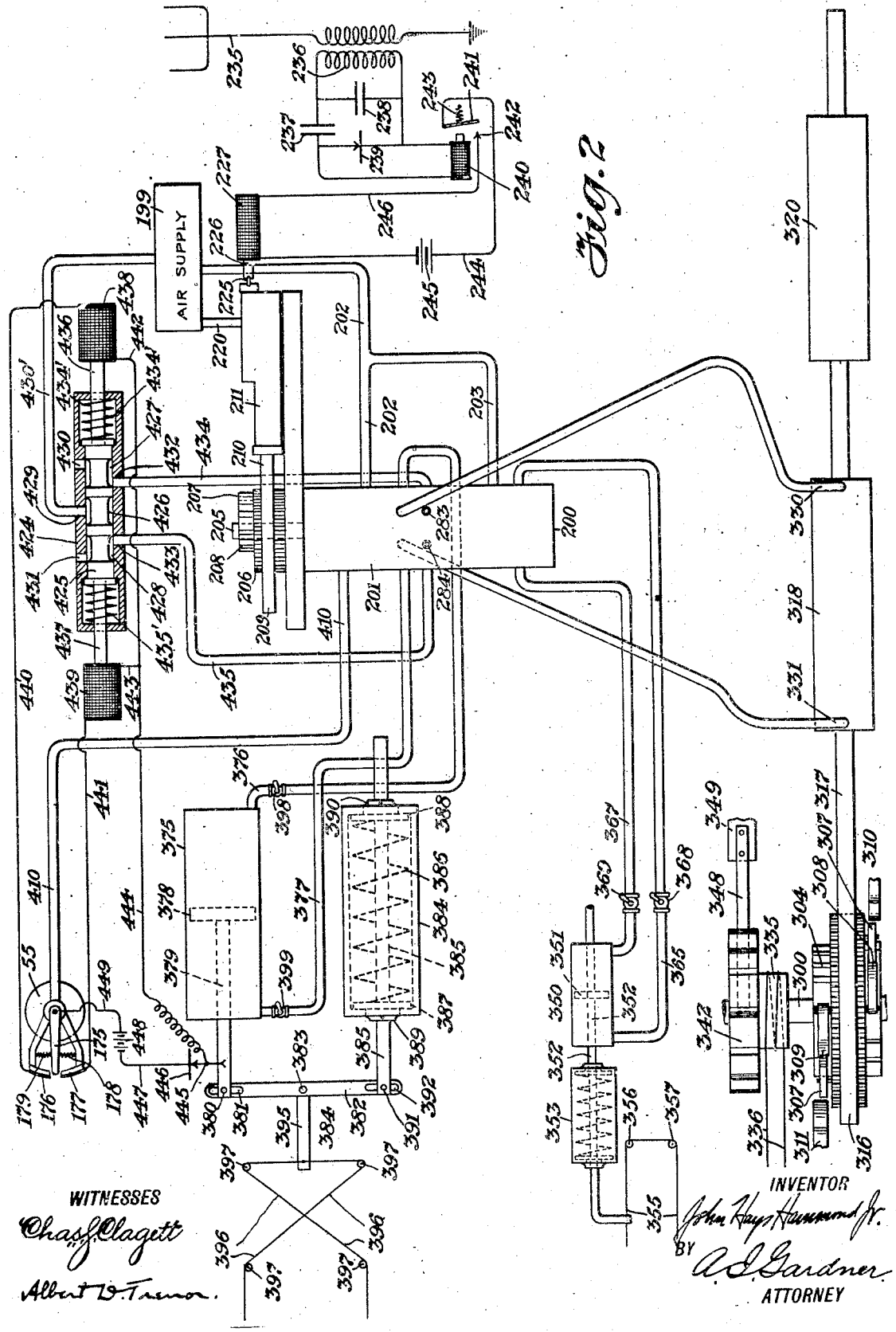

J. H. HAMMOND, JR 1,568,973

DIRIGIBLE DEVICE

Filed June 11, 1915 7 Sheets-Sheet 6

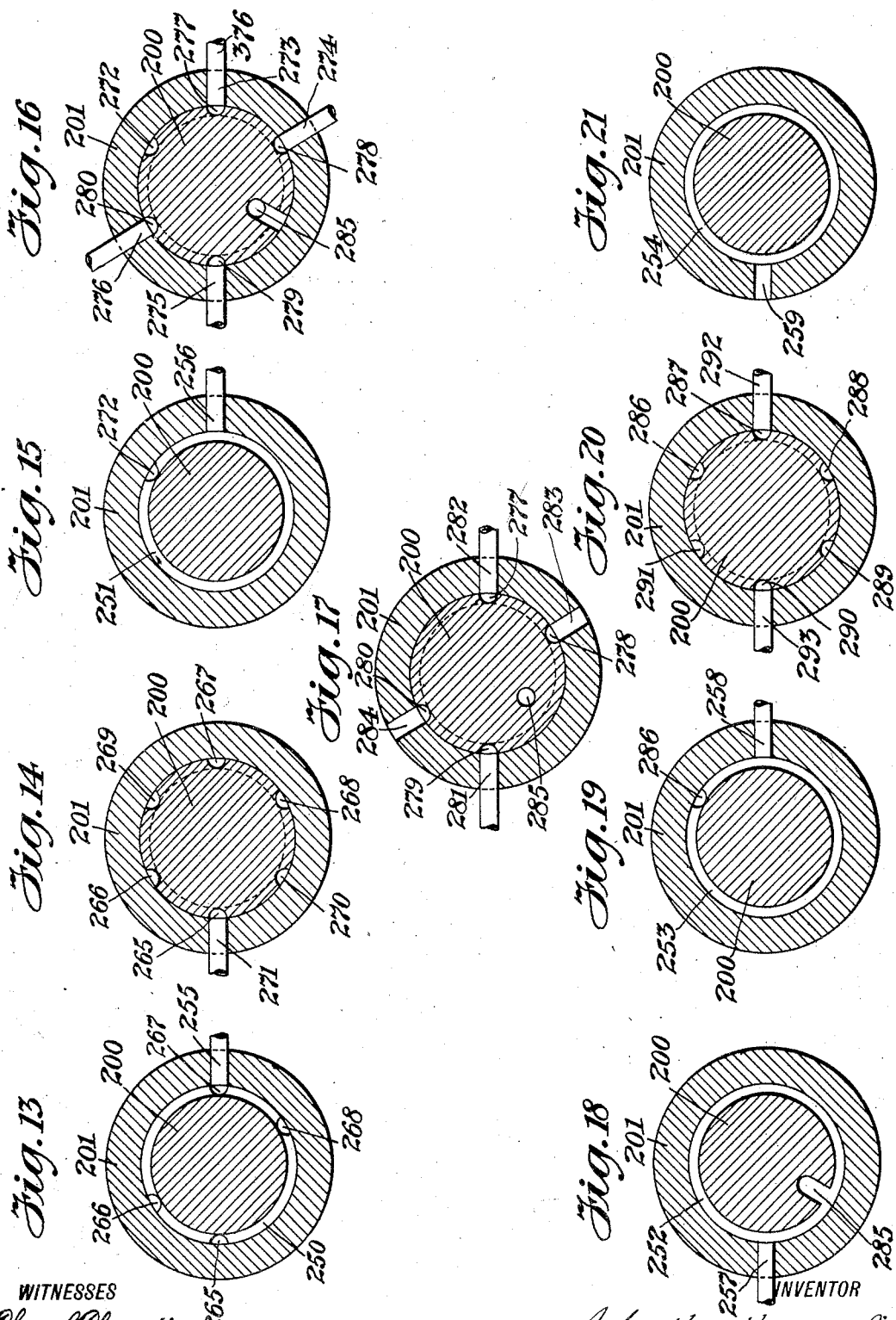

Patented Jan. 12, 1926.

1,568,973

UNITED STATES PATENT OFFICE.

JOHN HAYS HAMMOND, JR., OF GLOUCESTER, MASSACHUSETTS.

DIRIGIBLE DEVICE.

Application filed June 11, 1915. Serial No. 33,450.

*To all whom it may concern:*

Be it known that I, JOHN HAYS HAMMOND, Jr., a citizen of the United States, and a resident of Gloucester, State of Massachusetts, have invented certain new and useful Improvements in Dirigible Devices, of which the following is a specification.

Primarily one of the objects of this invention is to provide an improved air craft which when in operation may be automatically maintained normally upon a predetermined course, but which may be controlled or directed selectively from a distance through the agency of "wireless" or radiant energy. It is to be understood, however, that the invention is not limited in its application to any particular class of dirigible devices as this invention may be applied not only to air craft but also to water craft and even to vehicles designed for use upon the surface of the ground.

In the accompanying drawings, which show but one of the many possible embodiments of this invention:

Figs. 1 and 2 are diagrammatic fragmentary views, (Fig. 1 being partially in isometric), which taken together, disclose an aeroplane constructed in accordance with this invention;

Fig. 3 is an enlarged side elevation partly in vertical section of a portion of the same looking in the direction of the arrow 3—3 on Fig. 1;

Fig. 4 is an enlarged end elevation of a portion of the same looking in the direction of the arrow 4—4 on Fig. 1.

Fig. 5 is a fragmentary side elevation of a pneumatic device embodying a part of this invention;

Fig. 6 is a top plan view of the device shown in Fig. 5;

Fig. 7 is a side elevation of a detail of the device shown in Figs. 5 and 6;

Fig. 8 is an enlarged longitudinal section of a reciprocatory valve embodying a part of this invention;

Fig. 9 is an enlarged vertical central section of a pneumatic clutch and means cooperating therewith, embodying a part of this invention;

Figs. 10, 11 and 12 are enlarged longitudinal sectional views of a rotary valve embodying a part of this invention, the valve being shown in three successive operative positions in the three views respectively;

Figs. 13 to 21 are transverse sections on lines 13—13 to 21—21 of Fig. 10 respectively.

Referring to the drawings, one embodiment of this invention comprises an aeroplane, more specifically a biplane including as usual two main substantially parallel planes 30 and 31 fixed to the body or frame 32 of the aeroplane and extending transversely thereof, and any suitable propelling apparatus (not shown) for driving the aeroplane through the air.

For steering the aeroplane laterally or rotating the aeroplane about a normally substantially vertical axis, a "vertical" rudder 35 is pivotally mounted upon a vertical post 36 depending downwardly from and rigid with the rear end of the body 32 of the aeroplane, the rudder 35 being arranged to oscillate about an axis 37—37 fixed with respect to the aeroplane and normally extending substantially vertically.

For steering the aeroplane vertically or rotating the aeroplane about a transverse normally substantially horizontal axis a "horizontal" rudder 38 is pivotally mounted upon the rear end of the body 32 of the aeroplane to oscillate with respect thereto about an axis 39—39 fixed with respect thereto and extending transversely thereof and normally substantially horizontally.

For tilting, or rotating, or for balancing the aeroplane about the longitudinal axis of the aeroplane, any well known or suitable means may be provided, but in the form shown two ailerons or auxiliary planes 40, 41, are pivotally secured to the opposite ends of the main planes 30, 31 and are arranged to oscillate simultaneously in opposite directions with respect thereto about alined axes 42—42 and 43—43 extending substantially parallel to the main planes and fixed with respect thereto.

For stabilizing and for directing and maintaining the aeroplane on any predetermined course automatically, means including a gyroscopic or other suitable stabilizer or controller 50 is mounted upon the frame or body of the aeroplane and arranged to be energized by any suitable means (not shown) and to automatically control the ailerons 40, 41 and the horizontal rudder 38; and means including an azimuth gyroscope 55 or any other similar or suitable stabilizer or controller is mounted on the frame or body of the aeroplane and arranged to be energized by any suitable means (not shown), and to automatically control the vertical rudder 35.

The gyroscopic stabilizer or controller 50 is of a well known form comprising four rotary elements or gyroscopes 60, 61, 62 and 63 which are suitably mounted within and supported by two concentric rings 65 and 66, the inner one of which, 65, is mounted to oscillate upon horizontal diametrically opposed pivots 67 and 68 extending transversely of the aeroplane and carried by the outer ring 66, and the outer ring 66 is mounted upon two diametrically opposed pivots 69 and 70 rigid therewith and extending longitudinally of the aeroplane and at right angles to the transverse pivots 67 and 68. The longitudinal pivots 69 and 70 are mounted in bearings 71 and 72 respectively, to swing about an axis fixed with respect to the aeroplane and extending longitudinal thereof. Depending downwardly and centrally from the inner ring 65 and rigid therewith is an arm 75 which is maintained in a vertical position in a well known manner by the action of the gyroscopes 60, 61, 62 and 63. Mounted upon the lower end of the arm 75 to rotate with respect thereto about a vertical axis fixed with respect to the arm is a roller 80 which engages loosely and rotatably in a substantially semicircular groove 81 provided therefor in a substantially semi-circular rocker 82 to the ends of which are rigidly secured two opposed alined pivots 83 and 84 which are rotatably supported in spaced bearings 85 and 86 fixed upon the body of the aeroplane, whereby the rocker 82 is mounted to swing about an axis coincident with the axes of the pivots 83 and 84 and extending transversely of the body of the aeroplane and fixed with respect thereto. The axis of oscillation of the rocker 82 is also always in a vertical plane which includes the axes of the transverse pivots 67 and 68.

For automatically controlling the horizontal rudder electrically as a result of the action of the gyroscopic stabilizer 50, a segmental contact support 90 is rigidly secured to the transverse pivot 83 and is provided with two insulated alined segmental electric contacts 91 and 92 rigidly secured thereto and the adjacent ends of which are slightly separated by a rectangular piece of intermediate insulation 93 which is always maintained by the hereinbefore described gyroscopic means in a position above the transverse pivot 83 and in a vertical plane including the axis of the transverse pivot 83. Co-operating separately with the segmental contacts 91 and 92 is a transverse reference contact 94 which is rigid with and insulated from a radial arm 95 projecting upwardly from and rigid with a transverse pivot 96 which is mounted in a support 97 rigid with the body of the aeroplane to be adjustable about an axis coincident with the longitudinal axis of the transverse pivot 83 supporting the rocker 82 for a purpose that will be set forth hereinafter. The reference contact 94 is arranged to slidably engage either of the segmental contacts 91 or 92 or to rest out of contact with either upon the intermediate insulation 93.

For automatically controlling the ailerons 40 and 41 electrically as a result of the action of the gyroscopic stabilizer, the longitudinal pivot 69 of the stabilizer has fixedly secured thereon a segmental contact support 98 provided with two insulated alined segmental electric contacts 99 and 100 rigidly secured thereto and slightly spaced from each other by a rectangular piece of intermediate insulation 101. Arranged to co-operate separately with the two segmental contacts 99, 100 is a reference contact 102 which is rigid with a radial arm 103 rigid with a pivot 104 mounted to rotate in a support 105 fixed upon the body of the aeroplane, the reference contact being thus arranged to oscillate about an axis coincident with the axis of the longitudinal pivot 69. The intermediate insulation 101 is always maintained by the gyroscopic stabilizer in a position above and in a vertical plane including the axis of the longitudinal pivot 69; and the reference contact 102 is arranged to slidably engage either of the segmental contacts 99, 100 or to rest out of contact with either upon the intermediate insualtion 101.

For supplying power to oscillate the horizontal rudder 38 and the ailerons 40, 41, there are two parallel spindles 110 and 111 which extend longitudinally of the aeroplane and which are arranged to be rotated either in one direction or in the opposite direction and either separately or together about axes fixed with respect to the aeroplane. Rigidly secured to these two spindles respectively are two pulleys 112 and 113. Around the pulley 112 is wound a flexible wire or rope 114 which is carried over suitable idlers 115 and 116 and the ends of which are secured respectively to the ends of a rod 117 perpendicular to and rigid with the horizontal rudder whereby when the pulley 112 is rotated either in one direction or the other, the horizontal rudder 38 will be oscillated accordingly. The other pulley 113 is similarly connected by a flexible wire or rope 120 extending over idlers 121 and by branch wires or ropes 122 extending over idlers 123, 123 and 124, 124 with the ends of two rods 125 and 126 perpendicular to and rigid with the two ailerons 40, 41 respectively in such a manner that when the pulley 113 is rotated either in one direction or in the other the ailerons will be simultaneously oscillated accordingly in opposite directions so that when the free end of either aileron rotates upwardly, the free end of the other aileron will rotate downwardly.

For actuating or rotating the spindles 110 and 111 either in one direction or in the opposite direction, a propeller 130 is rigidly secured to one end of a shaft 131 extending longitudinally of the aeroplane and arranged to be rotated by the propeller 130 about an axis fixed with respect to the aeroplane as the aeroplane moves through the air. Motion is transmitted from the propeller shaft 131 to the spindles 110 and 111 through a pinion 132 rigidly secured to the propellor shaft and engaging two driving gears 133 and 134, coaxial respectively with the spindles 110 and 111. The driving gears 133 and 134 are operatively connected in a well known manner through internal gears (not shown) with two reversing gears 135 and 136, the driving gears 133 and 134 being thus arranged to rotate continually in one direction and the reversing gears 135 and 136 to rotate continually in an opposite direction. Motion is transmitted from either of the driving gears 133, 134 or from either of the reversing gears 135, 136 to the spindles 110 or 111 respectively by means of four magnetic clutches including four solenoids 140, 141, 142 and 143, four clutch members 144, 145, 146 and 147 rigidly connected to the four gears 133, 135, 134 and 136 respectively and four clutch members 148, 149, 150 and 151 independently movable into and out of clutching relation respectively as a result of the energization and deenergization of the corresponding solenoids 140, 141, 142 and 143.

For energizing the solenoids 140, 141, 142 and 143 either automatically, or selectively, as will appear hereinafter, to control the horizontal rudder 38 and the ailerons 40, 41, the outer ends of one pair of solenoids 140, 141 are connected by wires 155 and 156 with the corresponding segmental contacts 91 and 92, and their inner ends are connected by wires 157 and 158 through a battery 159 with the corresponding transverse reference contact 94; and the outer ends of the other pair of solenoids 142, 143 are connected by wires 160, 161 with the corresponding segmental contacts 99, 100 and their inner ends are connected by wires, 162, 163 through a battery 164 with the corresponding longitudinal reference contact 102.

For automatically oscillating the vertical rudder to control the lateral movement of the aeroplane, the azimuth gyroscope 55 or other suitable azimuth maintaining means is provided with an arm 175 which is at all times electrically insulated from the gyroscope but which is arranged to be operatively connected to the gyroscope or disconnected therefrom selectively through the action of a pneumatic clutch as will appear hereinafter. During the automatic control of the vertical rudder during any given period by the gyroscope, the arm 175 is operatively connected to the gyroscope through the action of the pneumatic clutch and is maintained by the gyroscope substantially in a vertical plane intersecting the horizon at a given point throughout the period. Upon opposite sides respectively of the central position of the free end of the arm 175 and arranged to be engaged thereby, are two electrical contacts 176 and 177 which are held against rotation about a vertical axis with respect to the aeroplane. Opposed light spiral springs 178, 179 tend to hold the free end of the arm 175 substantially midway between the contacts 176, 177 when the arm is not under the control of the gyroscope, but these springs yield to permit of the control of the arm by the gyroscope. The arm 175 cooperates with the contacts 176 and 177 to control the vertical rudder automatically as will appear hereinafter.

To permit of the selective control of the aeroplane by an operator located at a distance, the aeroplane is provided with pneumatic means or devices controlled by means responsive to radiant energy for selectively controlling the horizontal rudder 38 and the ailerons 40, 41 by suitably varying the positions of the reference contacts 94 and 102 of the gyroscopic stabilizer 50, and for disconnecting the azimuth gyroscope from its arm 175 and selectively controlling the vertical rudder 35, as will appear hereinafter.

The pneumatic means for selectively controlling the aeroplane includes a source of supply 199 of compressed air or other motive fluid and a rotary valve 200 arranged in a fixed valve casing 201 and connected to the source of air supply 199 by a pipe 202 and branch pipe 203, as will appear hereinafter. For giving a step by step rotary movement to the valve 200, which in the construction shown is a movement of 60 degrees at each step, and in one direction only, the valve is provided at one end with a stem 205 projecting outwardly through the casing 201, and a segmental gear 206 is loosely mounted upon the stem and carries pivoted thereto a ratchet 207 which engages a ratchet wheel 208 fixed upon the stem 205. An oscillatory movement is given to the segmental gear 206 by means of a reciprocatory rack 209 engaging the gear and forming an extension of a piston rod 210 which reciprocates in a cylinder 211 and which is provided within the cylinder with a piston 212 normally held in its innermost position by a spring 213. The cylinder 211 is connected to the source of air supply 199 by a pipe 220 which communicates with the cylinder through suitable inlet ports 214, 215 and passage 216, which leads from the cylinder and is also arranged to communicate with two exhaust ports 217, 218. The admission of air from the pipe 220 into, and the exhaust of air from the space within the cylinder back of the piston through the inlet and exhaust ports is controlled by a reciprocatory piston valve 225 provided with four annular recesses 225'. This valve 225 is connected to and controlled by a core 226 of a solenoid 227. The rack 209 is normally maintained in its innermost position with respect to the cylinder 211 by the spiral spring within the cylinder, and the solenoid 227 is normally deenergized and the piston valve 225 is normally held in its innermost position by a suitable spring normally maintaining the inlet into the cylinder from the pipe 220 closed and the exhaust ports 217 and 218 open.

For energizing and deenergizing the solenoid 227 to control the aeroplane at the will of an operator at a distance, means responsive to radiant energy in the form of electromagnetic waves are provided including any suitable open oscillatory receiving circuit 235 associated with a suitable closed oscillatory circuit including an inductance 236, condensers 237, 238, a detector 239 and a relay including an electromagnet 240 having a pivoted armature 241 arranged to engage a fixed control 242 normally held out of engagement therewith by a spring 243. One end of the solenoid 227 is connected to the armature 241 by a wire 244 extending through a battery 245, and the other end of the solenoid 227 is connected to the fixed contact 242 by a wire 246. The construction is such that when an impulse of radiant energy is received by the circuit 235, the magnet 240 is energized and closes the circuit through the battery 245 thus energizing the solenoid 227 and drawing its core 226 inwardly to open the inlet into the cylinder to force the rack 209 outwardly to rotate the valve 200 through one step, in this case through 60 degrees. When the radiant impulse ceases the armature 241, core 226 and rack 209 are returned to their normal positions under the action of their respective springs leaving the rotary valve in the position into which it has been rotated.

For distributing compressed air from the source of supply 199 to various devices for selectively controlling an aeroplane as will appear hereinafter, the rotary valve 200 is provided as shown in Figs. 10 to 21 with a plurality of recesses and passages, including five circumferential or annular recesses 250, 251, 252, 253 and 254 which for clearness may be named the outermost or first 250, second 251, third 252, fourth 253 and fifth 254 respectively. These five annular recesses are arranged to communicate at all times respectively with five transverse passages 255, 256, 257, 258 and 259 provided therefor through the valve casing 201.

The rotary valve 200 is also provided with two pairs of diametrically opposed longitudinal recesses 265, 266 267, 268 leading inwardly form the outermost annular recess 250, and with a pair of diametrically opposed longitudinal recesses 269, 270 leading outwardly from the second annular recess 251, these longitudinal passages being slightly longer in each case than half the distance between the first and second annular recesses 250, 251 and thus adapted to register or communicate in turn with a transverse passage 271 provided therefor through the valve casing midway between the first and second annular recesses.

The rotary valve 200 is further more provided with one longitudinal recess 272 extending inwardly from the second annular recess 251 slightly more than one third of the distance between the second and third annular recesses, the inner end of this longitudinal recess 272 being arranged to register or communicate successively with four transverse passages 273, 274, 275, 276 provided therefor through the valve casing. Also, two pairs of diametrically opposed longitudinal recesses 277, 278, 279, 280 are spaced in the valve between the second and third annular recesses 251 and 252, the outer ends of these longitudinal recesses being arranged to register or communicate successively with the four transverse passages 273, 274, 275, 276, and the lower ends of these four longitudinal recesses 277 to 280 being arranged to register or communicate successively with two pairs of diametrically opposed passages 281, 282, 283 and 284 provided therefor through the casing. Extending beneath the surface of the valve is a passage 285, one end of which opens through the surface of the valve at a point midway between the longitudinal recess 278 and 279 and so located that the upper end of this passage will register or communicate successively with four transverse passages 273, 274, 275 and 276 through the valve casing.

The rotary valve 200 is also provided with a longitudinal recess 286 extending inwardly from the fourth annular recess 253 and with five spaced longitudinal recesses 287, 288, 289, 290, 291 extending outwardly from the fifth annular recess 254, all of these longitudinal recesses being arranged to communicate in turn with two diametrically opposed transverse passages 292 and 293 extending through the casing 201 of the valve 200 at points midway between the fourth and fifth annular passages 253 and 254.

For selectively controlling the horizontal rudder by changing the position of the transverse reference contact 94, there is mounted upon the aeroplane a pneumatic device (see Figs. 1, 5, 6 and 7) including a shaft 300 which is arranged to rotate about an axis fixed with respect to the aeroplane in bearings 301, 302. Rigidly secured to the shaft 300 are two spaced ratchet wheels 303 and 304, the teeth of one ratchet wheel being arranged to face in a direction of rotation opposed to the direction of rotation faced by the teeth of the other ratchet wheel. Between the two ratchet wheels 303 and 304 and loosely mounted upon the shaft 300 is a gear wheel 305, which carries pivotally connected to the opposite sides thereof two oppositely extending pawls 306 and 307 arranged to engage the two ratchet wheels 303 and 304 respectively. Engaging the inner ends of the two pawls respectively are two springs 308, 309 which are fixed upon the opposite sides of the gear wheel 305 and which tend to press the inner ends of the pawls into engagement with their ratchet wheels. Two diametrically opposed fixed segmental cams or guides 310 and 311 are arranged upon opposite sides of the gear 305 and normally engage the outer ends of both pawls to hold the pawls out of engagement with the ratchet wheels, but these cams are arranged to permit either one of the pawls to be moved automatically into engagement with its ratchet wheel while the other pawl is held out of engagement with its ratchet wheel, upon a suitable rotation of the gear wheel 305 through a small arc. For rotating the gear 305 through a small arc in either direction, the gear is provided along only a part of its circumference with teeth 315 and these are engaged by a rack 316 which is rigid with a piston rod 317 which extends through a fixed power cylinder 318 in which a suitable piston 319 is fixed upon the rod.

For centralizing the piston rod 319 of the pneumatic device for selectively controlling the horizontal rudder, the piston rod 317 also extend through a spring cylinder 320 in which it is surrounded by a spiral spring 321 which is compressed between two discs 322, 323, arranged in the spring cylinder and loosely surrounding the piston rod 317 and pressed against the inner surfaces of the end walls of the spring cylinder. Normally engaging the outer surfaces of the two discs are two collars 324, 325 fixed upon the piston rod 317 and arranged to reciprocate therewith freely through apertures 326 and 327 provided therefor in the opposite ends of the spring cylinder.

For reciprocating the piston 319 to control the horizontal rudder the opposite ends of the cylinder 318 are connected by pipes 330 and 331 to the transverse passages 274 and 276 of the casing of the rotary valve 200 so that when the valve 200 is in a given position or in an opposite position the piston 319 will be moved either in one direction or in the opposite direction as will appear hereinafter.

Upon the shaft 300 is rigidly secured a pulley 335 around which is wound an endless rope or wire 336 which also extends over suitable idlers 337, 338, 339 and 340, and around a pulley 341 fixed upon the pivot 96 carrying the transverse reference contact 94, so that when the piston 319 is moved in either direction the transverse reference contact 94 of the gyroscopic stabilizer 50 will be shifted accordingly to energize the corresponding solenoid 140 or 141 and to swing the horizontal rudder 38 accordingly.

For yieldingly holding the shaft 300 in any position of rotative adjustment, to selectively control the horizontal rudder, a disk 342 is rigidly mounted upon the shaft 300 and is provided with a plurality of spaced peripheral V shaped notches 343, 344, 345, 346 adapted to receive a V shaped catch 347 which is fixed upon one end of a spring 348, the other end of which is secured to a fixed support 349, the catch 347 being normally pressed against the disk 342 by the spring 348 and being arranged to hold the shaft 300 and consequently the transverse reference contact 94 in any position of adjustment during the automatic operation of the aeroplane, but to yieldingly permit the adjustment of the transverse reference contact 94 through the action of the piston 319 under suitable pneumatic pressure during the selective control of the horizontal rudder of the aeroplane by an operator from a distant station.

For selectively controlling the ailerons 40, 41 by changing the position of the longitudinal reference contact 102, a power cylinder 350 is fixed upon the aeroplane and is provided with a reciprocatory piston 351 fixed upon a piston rod 352 extending slidably through the power cylinder and also through a centering device including a fixed spring cylinder 353, provided to center the piston 351 in its cylinder 350, this centering device being similar in construction to that hereinbefore described including the spring cylinder 320 for controlling the horizontal rudder. The outer end of the piston rod 352 is connected to an endless rope or wire 355 which passes around idlers 356, 357, 358 and 359 and around a pulley 360 rigidly secured to the pivot 104 upon which the longitudinal reference contact 102 is mounted. The opposite ends of the cylinder 350 are connected respectively by pipes 365 and 367 with the transverse passages 292 and 293 through the casing of the rotary valve 200. Needle valves 368 and 369 are placed in the pipes 365 and 367 and are adjustable to retard or to relatively facilitate the flow of air through the pipes to time the relative movement of the ailerons 40, 41 with respect to the selective movement of the vertical rudder 35 as will appear hereinafter. By this construction compressed air may be admitted from the source of supply 199 selectively to either end of the cylinder 350 and exhausted from the other end to move the piston 351 to shift the longitudinal reference contact 102 accordingly to energize the corresponding solenoid 142 or 143 and to swing the ailerons 40, 41 accordingly.

For selectively controlling the vertical rudder 35 a power cylinder 375 is provided, one end of which is connected by a pipe 376 to the passage 273 in the casing 201 of the rotary valve 200 and the other end of which is connected by a pipe 377 to the passage 275 in the casing 201. The cylinder is provided with a piston 378 secured to the inner end of a piston rod 379 the outer end of which carries a pin 380 which engages slidably in a slot 381 provided in one end of a lever 382 which is arranged to oscillate about a fixed pivot 383. For centering the piston 378 in the cylinder spring centering means is provided substantially the same in construction and operation as that hereinbefore described and including a fixed cylinder 384 a reciprocatory rod 385 extending through the cylinder, a spiral spring 386 and two discs 387, 388 loosely surrounding the rod, and two collars 389, 390 fixed upon the rod and arranged to reciprocate through the opposite ends of the cylinder 384 respectively. The outer end of the rod 385 carries a pin 391 which engages slidably in a slot 392 in the lever 382. Rigidly secured to and projecting transversely from the lever 382 is a bar 395 the outer end of which is secured by rope or wire 396 which extends over idlers 397, and the ends of which are connected to the ends of a rod 397' perpendicular to and rigid with the vertical rudder 35. Needle valves 398 and 399 are placed in the pipes 376 and 377 and are adjustable to retard or to relatively facilitate the flow of air through the pipes to time the selective movement of the vertical rudder 35 with respect to the selective movement of the ailerons 40, 41. By this construction when the piston is moved in either direction the vertical rudder 35 will be oscillated accordingly.

For selectively connecting and disconnecting the arm 175 to the azimuth gyroscope 55, to permit of the control of the vertical rudder 35 either automatically or selectively as may be desired, the arm 175 is fixed upon the upper end of a stem 400 which extends vertically downwardly from the arm and which is arranged to rotate snugly in and with respect to a sleeve 401, to which the spaced contacts 176 and 177 and the outer ends of the springs 178 and 179 are rigidly secured, and which is connected to the gyroscope and is maintained thereby in a vertical position and is held thereby against rotation in space about a vertical axis. The lower end of the stem is rigid with the upper end of a hollow cylinder 402 in which is a piston 403 which is rigid with the upper end of a piston rod 404 which projects downwardly through the lower end of the cylinder and through the upper end of a hollow head 405 which is rigid with the upper end of a rod or stem 406 which is a part of the gyroscope and which is always maintained thereby in a vertical position and is always held thereby against rotation in space with respect to its vertical axis. Rigid with the piston rod 404 and within the head 405 is a clutching disk 407 and within the cylinder 402 and surrounding the piston rod 404 is a spiral spring which normally forces the piston upwardly and causes the disk 407 to clamp the cylinder 402 and head 405 rigidly together. An axial passage 408 leads upwardly from the cylinder through the stem 400 and communicates at its upper end with an annular recess 409 in the stem which always communicates through a pipe 410 with the transverse passage 271 through the casing of the rotary valve 201 whereby by suitably positioning the rotary valve 200 compressed air may be admitted to the cylinder 402 to release the arm 175 from the control of the gyroscope 55 or may be exhausted from the cylinder 402 to permit the arm 175 to be controlled by the gyroscope 55.

For automatically controlling the vertical rudder 35 of the aeroplane as a result of the co-operative action between the arm 175 of the azimuth gyroscope 55 and the spaced contacts 176 and 177, an electro-magnetic valve is interposed between the source of air supply 199 and the rotary valve 200. The electromagnetic valve includes a cylindrical casing 424 in which is arranged to reciprocate a piston valve 425 which is provided with three annular recesses 426, 427, 428, the central one of which 426 normally communicates with the source of air supply through an inlet port 429 and pipe 430'. The outer annular recesses 427, 428, normally communicate respectively with exhaust ports 430, 431 and through two outlet ports 432, 433, and pipes 434 and 435 with the passages 282, 281 through the casing of the rotary valve 200. The piston valve is normally yieldingly centered in its casing by two opposed spiral springs 434', 435'.

For reciprocating the piston valve 425 to control the vertical rudder 35, the valve is provided with oppositely extending valve stems 436 and 437 which form the cores of two fixed solenoids 438, 439 respectively. The outer ends of these solenoids are connected by electric conductors 440, 441 with the two fixed contacts 176 and 177, respectively, and the inner end of these two solenoids are connected by conductors 442 and 443 to a common return conductor 444 which is arranged as will appear hereinafter to be normally connected through suitable helm limiting means and a battery 448 to the arm 175 of the azimuth gyroscope 55.

In controlling the vertical rudder 35 of the aeroplane automatically, if the azimuth gyroscope 55 were permitted to function freely, the vertical rudder would be oscillated through a wide angle approximately through an angle of 45° thus steering the aeroplane laterally first in one direction and then in an opposite direction on an appreciably zig zag course. To avoid such a zig zag movement, and to hold the aeroplane in an approximately straight or true course, the common return conductor 444 is connected to a movable contact 445 fixed upon but insulated from the piston rod 379 which controls the vertical rudder, and the contact 445 is arranged to slidably engage an elongated relatively stationary contact 446 which is held in a fixed position with respect to the aeroplane and which is connected by a conductor 447 with one pole of a battery 448 the other pole of which is connected by a conductor 449 with the arm 175 of the azimuth gyroscope 55. In this construction the angle through which the vertical rudder may be moved automatically may be varied by changing the length of the elongated contact 446 either by substitution or otherwise.

In operation of this improved aeroplane when it is desired to have the stabilizing and steering performed entirely automatically by the gyroscopes, the rotary valve is adjusted into the position shown in Fig. 10 which may be called the first position, or in a position which may be called the fourth position, (not shown) which is reached by rotating the valve through 180 degrees from its first position. When the valve is in either of these positions, the pressure cylinder 402 of the clutch of the azimuth gyroscope is permitted to exhaust through pipe 410 and recesses 265 or 267 and 250 of the rotary valve and exhaust outlet 255 thus permitting the spiral spring to connect the arm 175 rigidly to the stem 406 of the gyroscope 55 to permit the gyroscope 55 to function in the automatic control of the vertical rudder 35.

Also when the aeroplane is being automatically controlled and the rotary valve 200 is in either its first or its fourth position, the opposite ends of the cylinder 375 for selectively controlling the vertical rudder are normally open to exhaust through the pipes 376, 377, passages of the rotary valve 277 and 279, pipes 434 and 435 and exhaust ports 430 and 431 of the solenoid valve respectively, thus permitting the spring actuated piston rod 385 to center the vertical rudder 35, and to center the movable contact 445 with respect to the elongated contact 446.

Also, when the rotary valve is in either its first or its fourth position, the opposite ends of the cylinder 350 for selectively controlling the ailerons are normally open to exhaust through the pipes 365 and 367 recesses 287 and 290 or 290 and 287 of the rotary valve and the exhaust port 259 to permit the spring centering means 353 to center the longitudinal reference contact 102 of the gyroscopic stabilizer 50 for automatically controlling the ailerons 40, 41.

Also, when the rotary valve 200 is in either in its first or fourth position, the opposite ends of the cylinder 318 for selectively controlling the horizontal rudder 38 are normally open to exhaust through the pipes 330 and 331, longitudinal recesses 278 and 280, of the rotary valve 200 and transverse passages or exhaust ports 283 and 284 respectively to permit the spring centering means contained in the cylinder 320 to center the piston 319 and the rack 316 which is done without disturbing the position of the transverse reference contact 94 of the gyroscopic stabilizer 50 for automatically controlling the horizontal rudder 38.

In automatically controlling the aeroplane with respect to a vertical axis, if, on account of cross currents in the air or for any other reason the aeroplane should be slightly rotated in either direction about a vertical axis, or in other words slightly diverted laterally from a given course, and to such an extent that the aeroplane rotates with respect to the arm 175 until the free end of the arm comes into engagement with one or the other of the contacts 176, 177 fixed upon the aeroplane, then the corresponding solenoid 438 or 439 would be energized and draw the solenoid valve 425 towards it and place the corresponding end of the cylinder 375, for controlling the vertical rudder, into communication with the source 199 of air supply through the corresponding pipes 434 or 435, rotary valve casing 201 and corresponding pipes 376 or 377, leaving the other end of the cylinder 375 open to exhaust through the corresponding exhaust port 431 or 430, and the piston would be moved consequently in one direction or the other to swing the rudder accordingly to restore the aeroplane approximately to the given course.

To avoid an apparent zig zag movement of the aeroplane during this automatic control of the vertical rudder 35, the oscillation of the vertical rudder is limited to any suitable angle by suitably proportioning the length of the elongated contact 446. When the vertical rudder has been moved through such an angle that the movable contact 445 moves out of contact with the elongated contact at either end of the latter, the circuit through the solenoids 438, 439 is consequently broken, thus permitting the electromagnetic valve 425 to be moved by the corresponding spring 434 or 435 back to a central position in which both ends of the cylinder 375 are open to exhaust through the corresponding exhaust ports 430, 431 of the electromagnetic valve casing 424, as hereinbefore described, thus permitting the piston 378 to be returned towards a central position by the spring actuated rod 385 until the movable contact 445 is returned into engagement with the elongated contact 446, whereupon if the arm 175 is still in engagement with one of the spaced contacts 176, 177 the current will be restored through the corresponding solenoid 438 or 439 and the vertical rudder will be again moved accordingly as hereinbefore described to restore the aeroplane approximately to the given course. This breaking and remaking of the current by the movement of the contact 445 out of and into engagement with either end of the elongated contact 446 will be automatically repeated, if necessary, to cause a slight reciprocatory or fluctuating movement of the piston 378 upon the corresponding side of its central position and a correspondingly slight fluctuating or oscillating movement of the vertical rudder 35 upon the corresponding side of its central position until the aeroplane has been restored approximately to the given course. But when the vertical rudder is being controlled selectively the azimuth gyroscope is rendered temporarily ineffective and the vertical rudder is permitted to be moved through a comparatively wide angle as will appear hereinafter.

In automatically controlling the aeroplane with respect to a transverse horizontal axis to keep the aeroplane moving either in a predetermined horizontal plane or in a predetermined inclined plane either upwardly or downwardly, the transverse reference contact 94 is first correspondingly adjusted by rotatively adjusting the shaft 300 so that the catch 347 will engage in a suitable notch. For instance the notches 343, 344, 345 etc. are so arranged that when the catch is arranged as shown in Fig. 7 in a particular notch 344 the transverse reference contact 94 will be in a central position so that when the aeroplane is proceeding in a horizontal course, the transverse reference contact 94 will rest upon the intermediate insulation 93 and any deviation of the aeroplane from a horizontal course will cause the corresponding one of the segmental contacts 91 and 92 to engage the transverse reference contact 94 and energize the corresponding solenoid 140 or 141 to oscillate the horizontal rudder accordingly to restore the aeroplane to a horizontal course. In a similar manner the transverse reference contact 94 may be adjusted either in one direction or the other from a central position, so as to co-operate with the segmental contacts 91 and 92 in maintaining the aeroplane automatically either in an upwardly or a downwardly inclined course.

In the automatic control of the aeroplane with respect to its longitudinal axis, as a result of the co-operation between the longitudinal reference contact 102 and corresponding segmental contacts 99 and 100, the longitudinal axes of the two transverse main planes 30, 31 are normally maintained in substantially horizontal positions, or in other words the aeroplane is normally kept from rotating about its longitudinal axis. When the aeroplane tilts slightly from its normal position in either direction about its longitudinal axis, the corresponding segmental contact 99 or 100 will be brought into engagement with the longitudinal reference contact, which normally rests upon the insulation 101 between the two segmental contacts, and the corresponding solenoid 142 or 143 will be energized to oscillate the two ailerons 40, 41 simultaneously in opposite directions accordingly to restore the aeroplane to a normal position with respect to its longitudinal axis.

In selectively controlling the aeroplane laterally or with respect to a vertical axis, when it is desired to turn the aeroplane laterally towards the right from a given path, the rotary valve 200 is advanced, in response to suitable impulses of radiant energy, (shown in Fig. 10) into a position shown in Fig 11 which may be called the second position of the valve which is 60 degrees in advance of its first position, shown in Fig. 10. When the valve is in its second position, air is admitted from the source of suply 199 through pipes 202, branch pipe 203 pasage 258 recess 286, passage 292 and pipe 365 to the left hand end (viewing Fig. 2) of the cylinder 350 and the right hand end of the cylinder 350 is open to exhaust through the pipe 367 passage 293 recess 289 and exhaust passage or port 259. The piston rod 352 is thus forced to the right and by means of wire 355 rotates the longitudinal reference contact 102 into engagement with the segmental contact 100 and consequently energizes the solenoid 143 which swings the free end of the aileron 40 upon the right side of the aeroplane upwardly and correspondingly depresses the free end of the aileron 41 upon the left side of the aeroplane, consequently rotating or tilting the aeroplane about its longitudinal axis by lowering the right side of the aeroplane and raising its left side thus suitably "banking" the aeroplane to facilitate a lateral turning of the aeroplane to the right about a vertical axis. At the same time that the aeroplane is being "banked" as just described, for turning laterally towards the right, compressed air is admitted from the source 199 through the pipe 202 passage 256 recess 272 pipe 376 to the right hand end of the cylinder 375, and the left hand end of the cylinder 375 is open to exhaust through the pipe 377 passages 275, 285 and exhaust port or passage 257. The piston 378 is thus forced towards the left, and by means of wire 396 swings the free end of the vertical rudder 35 towards the right to turn the aeroplane laterally towards the right.

By a process the reverse of the one just described when the rotary valve has been rotated into its fifth position (not shown), 180 degrees from the second position shown in Fig. 11, in response to suitable impulses of radiant energy, the free end of the left hand aileron 41 is simultaneously raised to "bank" the aeroplane for turning towards the left and the free end of the vertical rudder is turned towards the left to turn the aeroplane laterally towards the left.

When the aeroplane is being selectively steered laterally through the action of the vertical rudder 35 and the ailerons 40, 41 as just described, the automatic control of the vertical rudder by the azimuth gyroscope 55 is temporarily discontinued automatically by the admission of compressed air from the source 199 through the pipe 202, annular recess 251 longitudinal recess 270 or 269, passage 271 and pipe 410 to the gyroscope which disconnects the arm 175 from the gyroscope as hereinbefore described.

Also, when the aeroplane is being selectively steered laterally, both ends of the cylinder 318 are automatically opened to exhaust through the pipes 330 and 331 longitudinal recess 277 and 279 and exhaust ports 283 and 284 respectively, thus permitting the horizontal rudder 38 to be controlled automatically by the gyroscopic stabilizer 50 as hereinbefore described.

In selectively controlling the aeroplane, when it is desired to rotate the aeroplane about a transverse horizontal axis so as to direct the aeroplane downwardly from a given path and in a predetermined plane in response to the action of the horizontal rudder 38, the rotary valve is rotated into a position, shown in Fig. 12, which may be called the third position. When the valve is in its third position, compressed air is admitted from the source 199 through the pipe 202 passage 256 annular recess 251 longitudinal recess 272 transverse passage 274 and pipe 330 to the right hand end of the cylinder 318; and the left hand end of the cylinder 318 is open to exhaust through the pipe 331 passages 276 and 285 annular passage 252 and exhaust port or passage 257. The piston 319 is thus moved towards the left moving the ratchet mechanism or shaft 300 and the wire 336 accordingly and shifting the transverse reference contact 94 rearwardly, and the free end of the horizontal rudder 38 is pulled downwardly thus turning the aeroplane downwardly as hereinbefore described.

When it is desired to rotate the aeroplane about a horizontal axis so as to direct the aeroplane upwardly from a given path and in a predetermined plane, the rotary valve 200 is rotated into its sixth position (not shown), 180 degrees in advance of its third position, shown in Fig. 12, and by a process the reverse of the one just described when the valve is in this position the free end of the horizontal rudder 38 will be moved upwardly to turn the aeroplane upwardly.

When the aeroplane is being selectively steered vertically by the action of the horizontal rudder 38 as just described, the pneumatic clutch of the azimuth gyroscope 55 is in communication with the exhaust port 255 through the pipe 410 longitudinal recess 268 or 266 and annular recess 250 to permit the azimuth gyroscope to control the vertical rudder 35 automatically as hereinbefore described.

Also, when the aeroplane is being selectively steered vertically both ends of the cylinder 350 are open to exhaust through the pipes 365 and 367, longitudinal recesses 291 and 288 or 288 and 291, annular recess 254 and exhaust port 259, to permit of the centralization of the longitudinal reference contact 102 and the automatic stabilizing of the aeroplane about its longitudinal axis by the gyroscopic stabilizer 50 acting through the ailerons 40 and 41 as hereinbefore described.

It is also to be noted that in the selective control of the aeroplane vertically or about a transverse horizontal axis through the action of the horizontal rudder 38, and in the selective control of the aeroplane about its longitudinal axis through the action of the ailerons 40, 41, the horizontal rudder and the ailerons are separately controlled through the action of the gyroscopic stabilizer 50 to rotate the aeroplane through a predetermined angle about and into a predetermined position with respect to the transverse horizontal axis, and to rotate the aeroplane through a predetermined angle about, and into a predetermined position with respect to its longitudinal axis, and to stabilize the aeroplane in each of those positions, the angle of rotation and the resultant stabilized position in each case being predetermined by selectively positioning the transverse and longitudinal reference contacts 94 and 102 respectively, as hereinbefore described.

In steering the aeroplane selectively the rotary valve 200 may be rotated so quickly from any given position through one or more intermediate positions to a second given position that no appreciable effect is produced upon the control or movement of the aeroplane as the valve passes through the intermediate position or positions. It is therefore possible to selectively control the movement of the aeroplane laterally and about its longitudinal axis, or vertically as hereinbefore described.

Although only a single form has been described in which this invention may be embodied, it is to be understood that the invention is not limited to any specific construction but may be applied in various forms to be controlled from a distance either by electromagnetic or "Hertzian" waves as hereinbefore described or by light waves, sound waves, or any other form of energy without departing from the spirit of the invention or the scope of the appended claims.

Having thus fully described this invention, I claim and desire to protect by Letters Patent of the United States:

1. The combination with a dirigible body of steering means carried thereby for steering said body laterally in either direction, stablilizing means cooperating with said steering means and automatically operative to maintain said body upon a given course, means for tilting said body in either direction upon an axis extending longitudinally of said body, stabilizing means cooperating with said tilting means and automatically operative independently of said first mentioned stabilizing means to stabilize said body with respect to said axis, and means including a fluid distributing valve which is operative to modify the action of said first mentioned stabilizing means and the action of said second mentioned stabilizing means and steer said body laterally in either direction and through any desired angle and to simultaneously tilt said body either in one direction or in an opposite direction about said axis depending upon the lateral movement of said body.

2. A system for controlling an air craft at a distance by radiant energy including in combination, an air craft having movable balancing means, fluid pressure means to move said balancing means, a controller governing the action of said fluid pressure means, and means responsive to radiant energy to modify the action of said controller relative to said fluid pressure means.

3. The combination with a dirigible body having movable balancing means for balancing the body in a natural medium and fluid pressure means to move said balancing means, of stabilizing means to control the action of said fluid pressure means, and means responsive to radiant energy for modifying the action of said stabilizing means relative to said fluid pressure means.

4. A system for controlling a dirigible body at a distance by radiant energy, including in combination a body arranged to float in a natural medium and having movable balancing means, fluid pressure means to move said balancing means, a controller governing the action of said fluid pressure means, and means responsive to radiant energy to modify the action of said controller relative to said fluid pressure means.

5. The combination with a dirigible body having means for rotating said body in either direction about its longitudinal axis or line of direction, and fluid pressure means to move said rotating means, of stabilizing means to control the action of said fluid pressure means, and means responsive to radiant energy for modifying the action of said stabilizing means relative to said fluid pressure means.

6. A system for controlling a dirigible body at a distance by radiant energy, including in combination a body arranged to float in a natural medium and having means for rotating said body in either direction around its longitudinal axis or line of direction, fluid pressure means to move said rotating means, a controller governing the action of said fluid pressure means, and means responsive to radiant energy to modify the action of said controller relative to said fluid pressure means.

7. A system for controlling a dirigible body at a distance by radiant energy including in combination a body arranged to float in a natural medium and having movable balancing means for balancing said body with respect to its longitudinal axis, fluid pressure means to move said balancing means, stabilizing means arranged to cooperate automatically with said movable balancing means to oppose any turning of the body around said axis, and means responsive to radiant energy from a distance to modify the action of said stabilizing means upon said movable balancing means.

8. A system for controlling a movable body of radiant energy including in combination a movable body having balancing means for determining the position of the body with respect to its longitudinal axis, fluid pressure means to move the balancing means, a controller cooperating with said balancing means to maintain the body in equilibrium with respect to said axis, and means responsive to radiant energy to modify the action of said controller upon said balancing means.

9. The combination with a movable body, of movable balancing means therefor, fluid pressure means to move said balancing means, a controller automatically cooperating with said balancing means and said fluid pressure means to maintain the body in equilibrium with respect to an axis extending substantially longitudinally of said body, and means responsive to radiant energy to modify the action of said controller upon said balancing means.

10. The combination with a movable body, of means for tilting said body with respect to an axis extending substantially longitudinally thereof, fluid pressure means to actuate said tilting means, a controller cooperating therewith for normally maintaining said body in equilibrium with respect to said axis, and means responsive to radiant energy to vary the action of said controller with respect to said tilting means.

Signed at New York in the county of New York and State of New York this 26th day of May A. D., 1915.

JOHN HAYS HAMMOND, Jr.